(12) United States Patent
Akhter et al.

(10) Patent No.: US 10,306,484 B2
(45) Date of Patent: May 28, 2019

(54) LONG RANGE BEAMFORMING AND STEERING IN WIRELESS COMMUNICATION LINKS

(71) Applicant: Integrated Device Technology, Inc., San Jose, CA (US)

(72) Inventors: Mohammad S. Akhter, Ottawa (CA); John Bradley Deforge, Chelsea (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/850,136

(22) Filed: Dec. 21, 2017

(65) Prior Publication Data

US 2019/0059003 A1 Feb. 21, 2019

Related U.S. Application Data

(60) Provisional application No. 62/547,608, filed on Aug. 18, 2017.

(51) Int. Cl.
*H04B 7/06* (2006.01)
*H04W 16/28* (2009.01)
*H04W 72/04* (2009.01)
*H04W 84/04* (2009.01)

(52) U.S. Cl.
CPC .......... *H04W 16/28* (2013.01); *H04B 7/0617* (2013.01); *H04W 72/044* (2013.01); *H04W 84/042* (2013.01)

(58) Field of Classification Search
CPC . H04W 16/28; H04W 72/044; H04W 84/042; H04B 7/0617
See application file for complete search history.

(56) References Cited

U.S. PATENT DOCUMENTS

| | | | |
|---|---|---|---|
| 2007/0279286 A1* | 12/2007 | Coutts | H01Q 9/0407 343/700 MS |
| 2013/0137455 A1* | 5/2013 | Xia | H02J 17/00 455/456.1 |
| 2014/0334565 A1* | 11/2014 | Tzanidis | H04B 7/0456 375/267 |
| 2016/0028451 A1* | 1/2016 | Hu | H04B 7/0452 370/329 |
| 2017/0041068 A1* | 2/2017 | Murakowski | H04B 10/11 |
| 2017/0077600 A1* | 3/2017 | Maltsev | H01Q 3/46 |
| 2018/0069605 A1* | 3/2018 | Gharavi | H04B 7/04 |

* cited by examiner

*Primary Examiner* — Brandon J Miller
(74) *Attorney, Agent, or Firm* — Christopher P. Maiorana, PC

(57) ABSTRACT

An apparatus includes a transceiver circuit, an antenna and a focus array. The transceiver circuit may have a plurality of fed channels configured to generate a plurality of signals. The antenna may have a plurality of antenna arrays configured to generate one or more beams in response to the signals. Each antenna array may (i) have a plurality of subarrays and (ii) be coupled to the fed channels of the transceiver circuit. The focus array may have a plurality of focal zones configured to reflect the beams into a beam zone. Each beam may be steerable by the antenna to one of the focal zones at a time. The focal zones may redirect the beams to a plurality of locations within the beam zone.

20 Claims, 4 Drawing Sheets

LONG RANGE BEAMFORMING AND STEERING IN WIRELESS COMMUNICATION LINKS

This application relates to U.S. Provisional Application No. 62/547,608, filed Aug. 18, 2017, which is hereby incorporated by reference in its entirety.

FIELD OF THE INVENTION

The invention relates to wireless communications generally and, more particularly, to a method and/or apparatus for implementing long range beamforming and steering in wireless communication links.

BACKGROUND

In conventional wireless communication systems, achieving fast beam steering can be difficult due to inherent limitations with phase and amplitude programming, computation, and settling time. Achieving long range, wireless communication links with high data rates can also be difficult. At a systems level, the conventional approach for high data rates over longer ranges utilizes high gain antennas. A challenge is a cost effective deployment of the high gain, narrow beam width antennas in the wireless communication systems. The narrow beam width antennas involve precision alignment at deployment.

It would be desirable to implement long range beamforming and steering in wireless communication links.

SUMMARY

The invention concerns an apparatus including a transceiver circuit, an antenna and a focus array. The transceiver circuit may have a plurality of fed channels configured to generate a plurality of signals. The antenna may have a plurality of antenna arrays configured to generate one or more beams in response to the signals. Each antenna array may (i) have a plurality of subarrays and (ii) be coupled to the fed channels of the transceiver circuit. The focus array may have a plurality of focal zones configured to reflect the beams into a beam zone. Each beam may be steerable by the antenna to one of the focal zones at a time. The focal zones may redirect the beams to a plurality of locations within the beam zone.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a method and/or apparatus for implementing long range beamforming and steering in wireless communication links that may (i) utilize a frequency dependent phase offset antenna array coupled with a tiled reflector and/or transmit array, (ii) utilize fast beam steering, (iii) achieve long range communication delivering very high capacity, (iv) utilize pre-loaded lookup tables to enable very fast beam steering, (v) be used in high data rate communications links, (vi) be implemented as part of a 5G wireless communications network, (vii) utilize reflector/transmit arrays to improve the steering and beam forming, (viii) provide time division duplex operations and/or (ix) be implemented with one or more integrated circuits.

Figure 1:
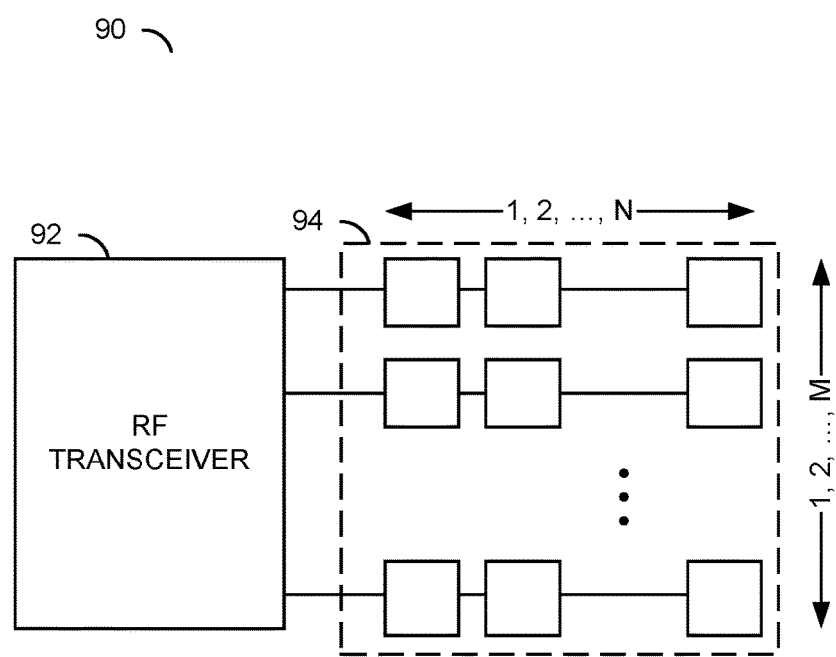
FIG. 1 is a diagram illustrating a typical phased array system utilizing a patch array.

Referring to FIG. 1, a block diagram illustrating a typical phased array system 90 is shown. The phased array system 90 utilizes a radio frequency (RF) transceiver 92 and a patch array 94. The patch array 94 may be configured as an N×M element array. The phased array system 90 may generate one or more radio-frequency beams at a time.

Figure 2:
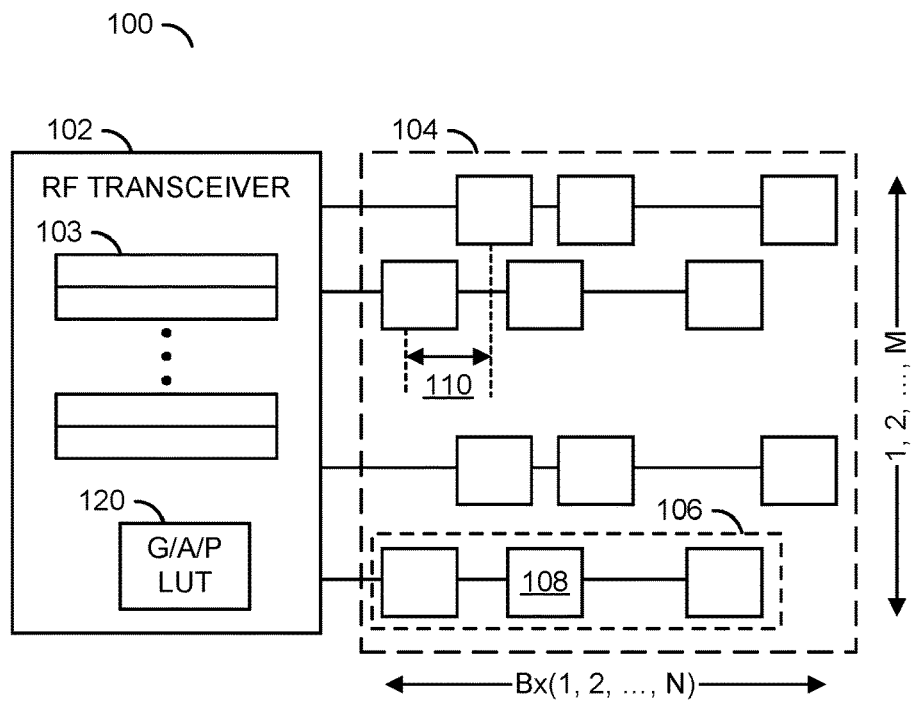
FIG. 2 is a diagram illustrating an RF transceiver antenna array module.

Referring to FIG. 2, a diagram illustrating an example of a radio frequency (RF) transceiver antenna array module 100 in accordance with an example embodiment of the invention is shown. The RF transceiver antenna array module 100 may be configured to operate with radio, millimeter, and/or microwave frequencies. In various embodiments, the RF transceiver antenna array module 100 may form part of a long range communications link. The long range communications link may be part of a fifth generation (5G) wireless communications system. In an example, the RF transceiver antenna array module 100 may comprise a block (or circuit) 102 and a block (or circuit) 104.

The circuit 102 may implement an RF transceiver circuit 102. In an example, the RF transceiver 102 may comprise a number (e.g., M) of fed channels 103. The RF transceiver 102 may comprise a gain, amplitude and phase lookup table (G/A/P LUT) 120. Gain values, amplitude values and phase values/parameters for beamforming may be pre-loaded into the G/A/P LUT 120 enabling very fast beam steering (e.g., approximately 30 nanoseconds) when implemented as part of a beamsteering network. The gain values, the amplitude values and the phase values may be copied into the fed channels 103 of the RF transceiver 102 to determine RF beam patterns created by the circuit 104.

The circuit 104 may implement an antenna array circuit 104. The antenna array 104 may comprise a number (e.g., M) of fed antenna arrays 106. In some embodiments, the number of fed antenna arrays 106 may be similar to the number of feed channels 103 in the RF transceiver 102. In various embodiments, multiple antenna arrays 106 may be coupled to a signal feed channel 103. Each fed antenna array 106 may include multiple antenna elements 108. The M fed channels 103 of the RF transceiver 102 may be coupled by corresponding bidirectional signals to the M fed antenna arrays 106 to implement an M-way antenna array module.

Each fed antenna array 106 may include multiple antenna elements 108 used for both transmission and reception. Each fed antenna array 106 may have a relative spatial offset 110 with respect to another (e.g., a neighboring) fed antenna array 106 along an axis (e.g., a horizontal axis as illustrated in FIG. 2). The offset 110 generally provides an improved two dimensional (e.g., horizontal and vertical as illustrated) control of the beam patterns compared with the patch array 94. Any or all of the fed antenna arrays 106 of the antenna array 104 may be switchable between a transmit mode and a receive mode in conjunction with any or all of the M fed channels 103 of the RF transceiver 102 to send and receive the signals.

Figure 3:
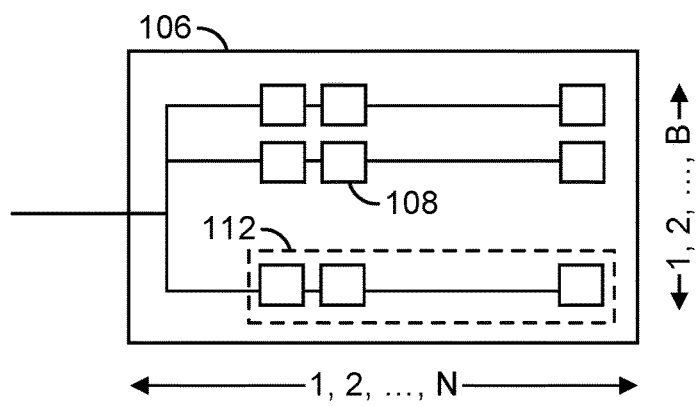
FIG. 3 is a diagram illustrating a fed antenna array.

Referring to FIG. 3, a diagram illustrating a fed antenna array 106 in accordance with an example embodiment of the invention is shown. In an example, each fed antenna array 106 may support B subarrays 112 (e.g., horizontal subarrays as illustrated). Each subarray 112 may include N antenna elements 108. The B×N antenna elements 108 within each fed antenna array 106 may be utilized for beam forming and/or shaping. Each of the B subarrays 112 may be frequency dependent. Each of the B subarrays 112 may be resonant based on a desired frequency band. The N antenna elements 108 within each fed antenna array 106 may be spatially aligned with respect to each other in two dimensions (e.g., horizontal and vertical as illustrated).

In an example embodiment, the antenna array 104 may comprise a set of antenna arrays (e.g., M×B×N antennas 108), where each fed antenna array 106 may feed the subarrays 112. In an example, each fed antenna array 106 may be active or inactive enabling a spatial shift in a phase center of the beam source from the array 104. The B×N individual antenna elements 108 in each of the B subarrays 112 may be utilized for beam forming and/or beam shaping. Each of the B subarrays 112 may be frequency dependent. Each of the B subarrays 112 may be resonant based on a desired frequency band. The N antenna elements 108 in each subarray 112 may be switchable to any of the M fed channels 103 within the RF transceiver 102.

Figure 4:
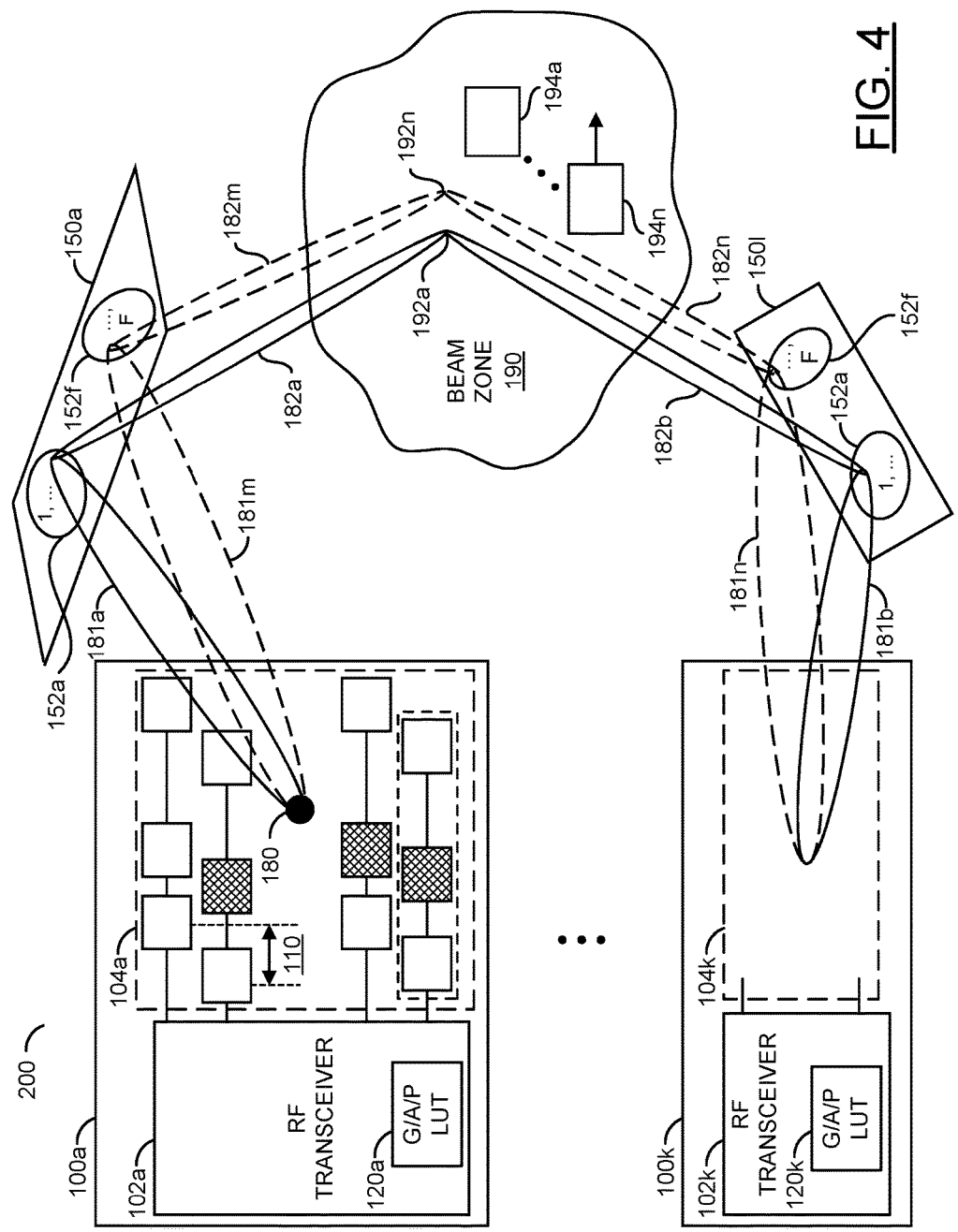
FIG. 4 is a diagram illustrating a long range communication system in accordance with an example embodiment of the invention.

Referring to FIG. 4, a diagram is shown illustrating a long range communication system 200 in accordance with an example embodiment of the invention. In various embodiments, the system 200 may utilize one or more frequency dependent phase offset antenna array modules coupled with one or more reflector arrays and/or transmit arrays (both referred to as focus arrays) and fast beam steering, where the phase offset antenna array modules may be tiled to achieve a long range communication system delivering very high capacity. In various embodiments, the reflector/transmit arrays may be tiled. In other embodiments, the reflector/transmit arrays may not be tiled. The communication may be bidirectional between the system 200 and devices (or transceivers) serviced by the system 200. In various embodiments, the communication may be time division duplex (TDD) communication.

In an example, the system 200 may comprise a number of RF transceiver antenna array modules 100a-100k and a number of reflector arrays (RAs) 150a-150l, also known as reflectarrays. In various embodiments, the RF transceiver antenna array modules 100a-100k are generally implemented similarly to the RF transceiver antenna array module 100 described above in connection with FIG. 2. In other embodiments, the RF transceiver antenna array modules 100a-100k may be implemented similarly to the phased array system 90 described above in connection with FIG. 1.

In each of the RF transceiver antenna array modules 100a-100k, each of the M fed antenna arrays 106 may be active or inactive (illustrated in FIG. 4 by crosshatching) enabling a spatial shift in a phase center 180 of the beam source from the array 106. Very fine tuning and/or steering may be achieved by finely adjusting the phase center 180 created by the antenna array (e.g., 104a). Each antenna fed array 106 supports B×N antenna elements 108 for beam forming and/or beam shaping. Each of the B subarrays 112 may be frequency dependent and be resonant based on the desired frequency band. Each subarray 112 may have N antenna elements 108 switchable to any of the M fed channels 103 in a corresponding RF transceiver 102a-102k. Each neighboring antenna fed array 106 may have the relative spatial offset 110 with respect to one another.

The multiple RF transceiver antenna array modules 100a-100k may be tiled to create a larger antenna array. Each of the RF transceiver antenna array modules 100a-100k may comprise a gain, amplitude and phase lookup table (G/A/P LUT) 120a-120k, similar to the G/A/P LUT 120 (see FIG. 2). The gain values, the amplitude values and the phase values for the beamforming network may be pre-loaded into the G/A/P LUTs 120a-120k in the individual RF transceivers 102a-102k enabling very fast beam steering.

Each reflector array 150a-150l may comprise multiple focal zones 152a-152f. In various embodiments, each focal zone 152a-152f may have a unique geometry that establishes unique properties of focus, gain, angle of arrival (AoA), angle of departure (AoD) and/or beam shape relative to the other focal zones 152a-152f. In some embodiments, some to all of the focal zones 152a-152f may share a common geometry and common properties of focus, gain, angle of arrival and angle of departure. Generally, each focal zone 152a-152f of an individual reflector array 150a-150l may be associated with a respective location 192a-192 within the beam zone 190. In some example implementations, an organization of the sub-geometries that create a particular focal zone may be printed and/or completely passive. In other example implementations, the sub-geometries may be actively reconfigured electronically and/or reconfigured by mechanical devices (e.g., rotation relative to the feed on the RF transceiver antenna array modules 100a-100k).

In various embodiments, each array 150a-150l may implement a transmit array (TA), also known as a transmitarray. The beams 182a-182n may be transmitted through substrates of the transmit arrays, instead of reflecting off the surfaces of the reflector arrays 150a-150l. By a nature of the transmit array pattern, the beams 182a-182n may be modified (e.g., concentrated and/or steered) by focal zones in transmit arrays, similar to the concentrating and/or steering in the reflector arrays 150a-150l. The reflector arrays and the transmit arrays may both be referred to as focus arrays.

Each RF transceiver antenna array module 100a-100k may be used in conjunction with a respective one of the reflector arrays 150a-150l. Each reflector array 150a-150l may be aligned with the RF transceiver antenna array modules 100a-100k to direct one or more beams 182a-182n into a beam zone 190. The beam zone 190 may contain multiple locations (or positions) 192a-192n. In an example, a beam 182a may be established between the RF transceiver antenna array module 100a and the location 192a. Another beam 182b may be established between the RF transceiver antenna array module 100k and the location 192a. The location 192n may be linked with the RF transceiver antenna array module 100a by a beam 182m and with the RF transceiver antenna array module 100k by a beam 182n.

The locations 192a-192n may be designed to provide communication services with multiple devices (or transceivers) 194a-194 within the beam zone 190. Some locations 192a-192n may be placed at or near fixed (or immobile) devices (e.g., 194a), such as buildings and/or relay towers. Other locations 192a-192n may be placed at or near roads, sidewalks and other structures where the devices 194a-194n are likely to be mobile (e.g., 194n).

The beams 182a-182n of the RF transceiver antenna array modules 100a-100k may be steered to the desired focal zones 152a-152f of the reflector arrays 150a-150l and subsequently reflected to the desired locations 192a-192n. Generally, each beam 182a-182n illuminates a single focal zone 152a-152f at a time. The focal zones 152a-152f may focus and shape the beams 182a-182n to provide a higher overall gain as seen at the locations 192a-192n. Shifting the phase center 180 of a beam source (e.g., beam 182*a*) of the RF transceiver antenna array modules 100*a*-100*k* generally enables super fine steering of the beam in the resultant beam zone 190. Adjusting the beam directions 181*a*-181*n* (e.g., the beam 182*a* may be steered from a direction 181*a* to a direction 181*m*) to different focal zones 152*a*-152*f* on the reflector arrays 150*a*-150*l* generally results in coarse or spot steering of the beams in the beam zone 190 (illustrated by the dashed ellipses). The overall gain of the antenna arrays 104*a*-104*k* and the reflector arrays 150*a*-150*k* of the system 200 generally results in very long range links.

Figure 5:
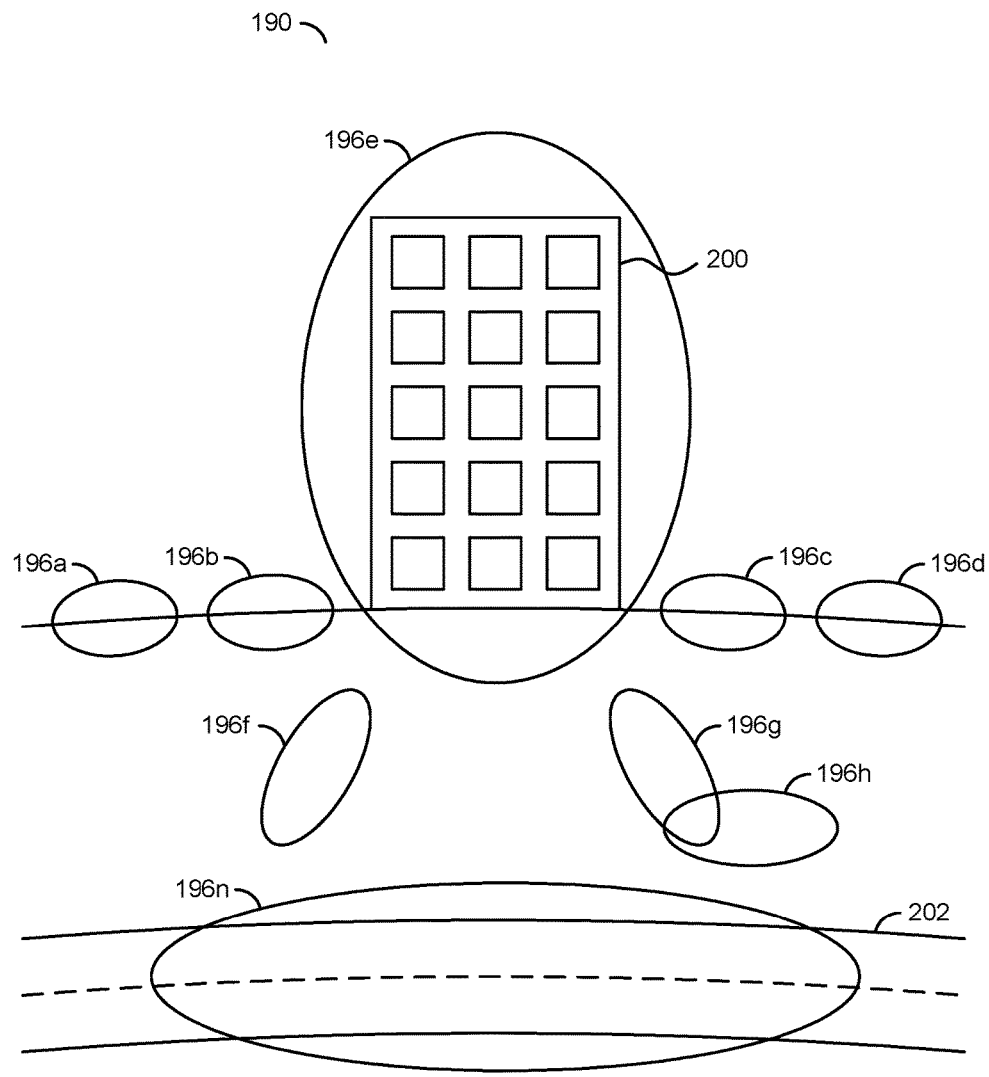
FIG. 5 is a diagram illustrating a beam zone.

Referring to FIG. 5, a diagram of an example beam zone 190 is shown from a horizontal point of view. The beam zone 190 may be three dimensional (e.g., horizontal, vertical and height). In the example, the beam zone 190 is divided into multiple regions (or areas) 196*a*-196*n*. Each area 196*a*-196*n* generally corresponds to at least one location 192*a*-192*n* (see FIG. 4) within the beam zone 190. The beam zone 190 may include multiple structures, such as a building 200 and a street 202.

Some of the regions 196*a*-196*n* may be overlapping (e.g., 196*g* and 196*h*). Other regions 196*a*-196*n* may be non-overlapping (e.g., 196*a* and 196*b*). Some regions 196*a*-196*n* may be serviced by a single RF transceiver antenna array module 100*a*-100*k*. Other regions 196*a*-196*n* may be simultaneously serviced by two or more RF transceiver antenna array modules 100*a*-100*k*.

The geometries (or shapes) and dimensions of the regions 196*a*-196*n* are generally determined by the focal zones 152*a*-152*f* of the reflector arrays 150*a*-150*l*. A geometry of the regions 196*a*-196*n* is generally oval (or elliptical). A major axis of the ovals may be horizontal (e.g., region 196*n*), vertical (e.g., region 196*e*) or at any other angle. In various embodiments, one or more regions 196*a*-196*n* may be allocated to the structures within the beam zone 190. In the example, the building 200 may be within the region 196*e*. In other examples, the building 200 may be divided among several regions 196*a*-196*n* with smaller regions covering portions of the building 200 commonly having higher numbers of devices 194*a*-194*n*. In another example, the road 202 may be serviced by the region 196*n* within the beam zone 190. Other configurations, numbers and shapes of the regions may be implemented to meet the design criteria of a particular application.

The functions and structures illustrated in the diagrams of FIGS. 1 to 5 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a transceiver circuit comprising a plurality of fed channels configured to generate a plurality of signals;
   an antenna comprising a plurality of antenna arrays configured to generate a plurality of beams in response to said signals, wherein each of said antenna arrays (i) comprises a plurality of subarrays and (ii) is coupled to said fed channels of said transceiver circuit; and
   a focus array comprising a plurality of focal zones configured to reflect said beams into a beam zone, wherein (i) each of said beams is steerable by said antenna to one of said focal zones at a time, (ii) said focal zones redirect said beams to a plurality of locations within said beam zone, (iii) each of said focal zones is associated with a respective one of said locations within said beam zone, (iv) said transceiver circuit is further configured to steer one or more of said beams among different ones of said focal zones of said focus array to coarsely redirect said one or more beams to different ones of said locations in said beam zone and (v) adjust one or more respective phase centers of said one or more beams to finely steer said one or more beams within said locations.

2. The apparatus according to claim 1, wherein said transceiver circuit, said antenna and said focus array form a 5G wireless communications system.

3. The apparatus according to claim 1, wherein said focal zones have a plurality of patterns that determine a geometry of said beams at said locations.

4. The apparatus according to claim 1, wherein said transceiver circuit is further configured to receive another signal transmitted from a device in said beam zone.

5. The apparatus according to claim 1, wherein said transceiver circuit is configured to operate a plurality of antenna elements of said antenna for one or more of (i) forming of said beams and (ii) shaping of said beams.

6. The apparatus according to claim 1, wherein:
   each of said subarrays comprises a plurality of antenna elements; and
   each of said antenna arrays has a relative spatial offset with respect to another of said antenna arrays.

7. The apparatus according to claim 1, wherein each of said subarrays is (i) frequency dependent and (ii) resonant based on a frequency band.

8. The apparatus according to claim 1, wherein said transceiver circuit comprises a lookup table configured to store a plurality of gain values, a plurality of amplitude values and a plurality of phase values used by said fed channels.

9. The apparatus according to claim 8, wherein said fed channels use said gain values, said amplitude values and said phase values to control steering of said beams.

10. A system comprising:
a plurality of transceiver antenna array modules each comprising a transceiver circuit and an antenna, wherein (i) each of said transceiver circuits comprises a plurality of fed channels, (ii) each of said antenna is coupled to said fed channels of a corresponding one of said transceiver circuits, (iii) each of said antenna comprises a plurality of subarrays and (iv) each of said antenna is configured to generate a plurality of beams; and
a plurality of focus arrays each comprising a plurality of focal zones configured to reflect said beams into a beam zone, wherein (i) each of said beams is steerable by said antennas to one of said focal zones at a time, (ii) said focal zones redirect said beams to a plurality of locations within said beam zone, (iii) each of said focal zones is associated with a respective one of said locations within said beam zone, (iv) said transceiver antenna array modules are configured to steer said beams to different ones of said focal zones of said focus arrays to coarsely redirect said beams to different ones of said locations in said beam zone and (v) adjust a plurality of respective phase centers of said beams to finely steer said beams within said locations.

11. The system according to claim 10, wherein said transceiver antenna array modules and said focus arrays are configured to form a long range communications link.

12. The system according to claim 11, wherein said long range communications link is part of a 5G wireless communications system.

13. The system according to claim 10, wherein at least one of said focal zones in at least two of said focus arrays are configured to redirect said beams to a common one of said locations within said beam zone.

14. The system according to claim 13, wherein said focus arrays are configured to redirect said beams in three dimensions within said beam zone.

15. The system according to claim 10, wherein said antenna are configured to steer said beams in two dimensions across said focus arrays.

16. The system according to claim 10, wherein at least one of said beams is received by at least one device that is mobile.

17. The system according to claim 10, wherein at least one of said beams is received by at least one device that is stationary.

18. The system according to claim 17, wherein said at least one device is configured to transmit a signal that is received by a corresponding one of said transceiver circuits.

19. An apparatus comprising:
a transceiver circuit comprising a plurality of fed channels configured to generate a plurality of signals;
an antenna comprising a plurality of antenna arrays configured to generate a plurality of beams in response to said signals, wherein (i) each of said antenna arrays (a) comprises a plurality of subarrays and (b) is coupled to said fed channels of said transceiver circuit, (ii) each of said subarrays comprises a plurality of antenna elements, and (iii) each of said antenna arrays has a relative spatial offset with respect to another of said antenna arrays; and
a focus array comprising a plurality of focal zones configured to reflect said beams into a beam zone, wherein (i) each of said beams is steerable by said antenna to one of said focal zones at a time, (ii) said focal zones redirect said beams to a plurality of locations within said beam zone and (iii) each of said focal zones is associated with a respective one of said locations within said beam zone.

20. The apparatus according to claim 19, wherein said transceiver circuit, said antenna and said focus array form a 5G wireless communications system.

* * * * *